United States Patent
Biskeborn

(10) Patent No.: US 8,139,318 B2
(45) Date of Patent: Mar. 20, 2012

(54) PLANAR BIDIRECTIONAL TAPE HEAD WITH PLANAR READ AND WRITE ELEMENTS

(75) Inventor: Robert G. Biskeborn, Hollister, CA (US)

(73) Assignee: International Business Machines Corporation, Armonk, NY (US)

( * ) Notice: Subject to any disclaimer, the term of this patent is extended or adjusted under 35 U.S.C. 154(b) by 43 days.

(21) Appl. No.: 12/686,689

(22) Filed: Jan. 13, 2010

(65) Prior Publication Data

US 2010/0110586 A1 May 6, 2010

Related U.S. Application Data

(62) Division of application No. 11/532,986, filed on Sep. 19, 2006, now abandoned.

(51) Int. Cl.
*G11B 5/29* (2006.01)
(52) U.S. Cl. .......................... 360/121; 360/129
(58) Field of Classification Search .................. 360/121, 360/129
See application file for complete search history.

(56) References Cited

U.S. PATENT DOCUMENTS

| | | |
|---|---|---|
| 3,593,414 A | 7/1971 | Beun |
| 3,662,119 A | 5/1972 | Romankiw et al. |
| 4,376,337 A | 3/1983 | Kobayasi et al. |
| 4,405,960 A | 9/1983 | Pick et al. |
| 4,698,708 A | 10/1987 | Lazzari |
| 5,022,141 A | 6/1991 | Nagata et al. |
| 5,121,270 A | 6/1992 | Alcudia et al. |
| 5,155,643 A | 10/1992 | Jones et al. |
| 5,189,572 A | 2/1993 | Gooch |
| 5,208,714 A | 5/1993 | Denison et al. |
| 5,220,473 A | 6/1993 | Brock et al. |
| 5,237,476 A | 8/1993 | Bischoff et al. |
| 5,289,328 A * | 2/1994 | Saliba ........................... 360/121 |
| 5,375,023 A | 12/1994 | Ju et al. |
| 5,483,394 A | 1/1996 | Harman |
| 5,574,602 A | 11/1996 | Baca et al. |
| 5,621,594 A | 4/1997 | Gray et al. |
| 5,737,156 A | 4/1998 | Bonyhard |
| 5,831,798 A | 11/1998 | Muller et al. |
| 5,862,014 A | 1/1999 | Nute |
| 5,910,869 A | 6/1999 | Fedeli |

(Continued)

FOREIGN PATENT DOCUMENTS

EP 1107236 A1 * 6/2001

(Continued)

OTHER PUBLICATIONS

"Thin Film and Thin Film Ferrite Hybrid Magnetic Head," IBM Technical Disclosure Bulletin, Jun. 1975, pp. 19-22.

(Continued)

*Primary Examiner* — Mohammad Ghayour
*Assistant Examiner* — Carlos E Garcia
(74) *Attorney, Agent, or Firm* — Walter W. Duft

(57) ABSTRACT

A planar bidirectional tape head with planar read and write elements for reading and writing data on a magnetic recording tape includes a substrate, a tape bearing surface for engaging the magnetic tape, one or more write element arrays formed on the substrate, and one or more read element arrays formed on the substrate. The one or more write element arrays and the one or more read element arrays comprise plural thin film layers oriented in generally parallel relationship with the tape bearing surface.

18 Claims, 14 Drawing Sheets

READ WRITE READ

U.S. PATENT DOCUMENTS

| | | | |
|---|---|---|---|
| 5,917,671 | A | 6/1999 | Kaaden et al. |
| 5,949,624 | A | 9/1999 | Simmons et al. |
| 5,969,912 | A | 10/1999 | Cope |
| 6,141,174 | A | 10/2000 | Judge et al. |
| 6,169,640 | B1 | 1/2001 | Fasen |
| 6,212,034 | B1 | 4/2001 | Fedeli et al. |
| 6,430,008 | B1 | 8/2002 | Trabert et al. |
| 6,456,460 | B1 | 9/2002 | Connelly et al. |
| 6,496,329 | B2 | 12/2002 | Hungerford et al. |
| 6,690,542 | B1 | 2/2004 | Wang |
| 6,722,019 | B1 | 4/2004 | Krounbi et al. |
| 6,768,606 | B2 | 7/2004 | Helms |
| 6,781,784 | B2 | 8/2004 | Peterson |
| 7,130,152 | B1 | 10/2006 | Raymond et al. |
| 2002/0034042 | A1 | 3/2002 | Hungerford et al. |
| 2003/0011922 | A1 | 1/2003 | Nozieres et al. |
| 2003/0039070 | A1 | 2/2003 | Biskeborn et al. |
| 2004/0060163 | A1 | 4/2004 | Biskeborn et al. |
| 2005/0007700 | A1* | 1/2005 | Nagai .................. 360/241.1 |
| 2005/0013042 | A1 | 1/2005 | Rubas et al. |
| 2005/0018349 | A1* | 1/2005 | Eaton .................. 360/129 |
| 2005/0152067 | A1 | 7/2005 | Yip et al. |
| 2005/0259364 | A1 | 11/2005 | Yip |

FOREIGN PATENT DOCUMENTS

| | | |
|---|---|---|
| EP | 1381031 A1 | 1/2004 |
| FR | 2769399 A1 | 4/1999 |

OTHER PUBLICATIONS

Fan et al., "Compact Horizontal Head Structure for Arrays," IBM Technical Disclosure Bulletin, Jun. 1, 1993, v36, n5, pp. 377-378.

U.S. Appl. No. 12/686,710, Office Action dated May 25, 2011, 19 pages.

U.S. Appl. No. 12/686,710, Office Action Response dated Aug. 25, 2011, 19 pages.

* cited by examiner

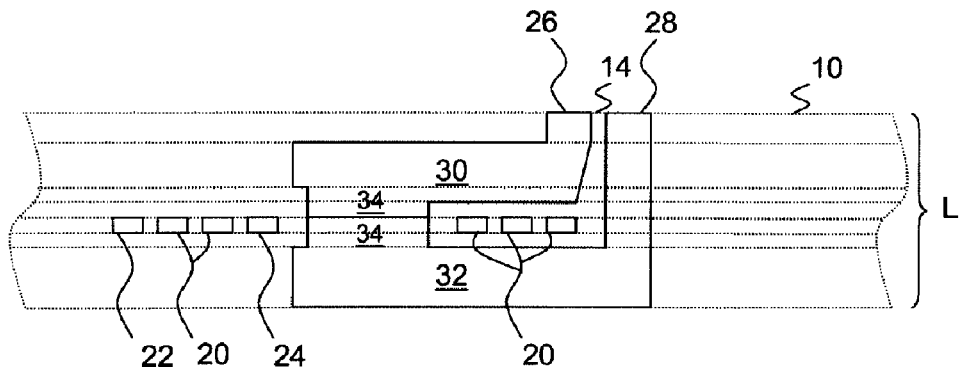
*FIG. 6*
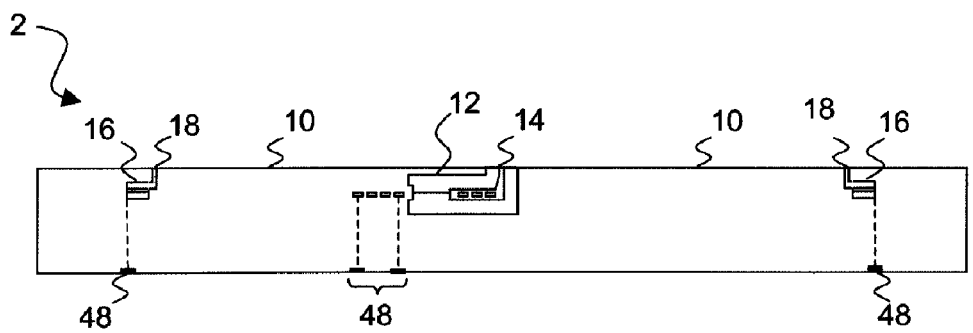
*FIG. 7*
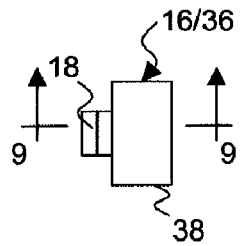
*FIG. 8*
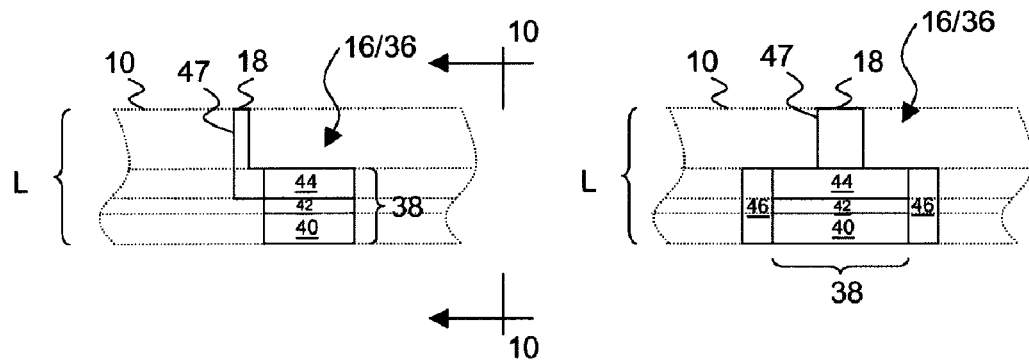
*FIG. 9*     *FIG. 10*

PLANAR BIDIRECTIONAL TAPE HEAD WITH PLANAR READ AND WRITE ELEMENTS

This application is a divisional under 35 U.S.C. 120 of application Ser. No. 11/532,986, filed Sep. 19, 2006, entitled "Planar Bidirectional Tape Head With Planar Read and Write Elements."

BACKGROUND OF THE INVENTION

1. Field of the Invention

This invention relates to tape drive data storage systems. More particularly, the invention is directed to thin film tape heads for reading and writing data on magnetic recording tape.

2. Description of the Prior Art

Thin film tape heads for magnetic information storage systems (e.g., tape drives) have been constructed using the same fabrication techniques used by disk drive manufacturers. A characteristic of such construction is that the thin film layers which comprise the read and write transducer elements are oriented perpendicularly to the tape bearing surface (TBS) of the head. Such heads may be referred to as "vertical" heads due to the fact that the read and write gap portions are situated at the TBS, while the element layer structures extend vertically away from the TBS. In a vertical head with multi-track recording capability, plural transducer elements are commonly arranged side-by-side to form a linear transducer array that is transverse to the direction of tape movement. Each transducer element in the array is positioned to write or read a separate longitudinal track on the tape. This arrangement is shown in FIG. 1, which depicts a vertical head "H" having an array of thin film transducer elements "E" whose gaps "G" engage a tape "T" along tracks "TR" in the direction of tape movement "D." FIG. 2 illustrates an exemplary internal construction of the vertical head "H" in which the transducers comprise alternating read and write elements "R" and "W." As shown in FIG. 3, the vertical head "H" of FIG. 2 can be secured to a mounting block "MB" in association with a complimentary vertical head "H" whose read and write elements are in reverse order. The resultant head assembly will have read/write element pairs that are aligned in the trackwise direction of the tape "T." This arrangement provides conventional read-after-write capability in which data written to the tape "T" is immediately read back and checked for errors. Read-after-write capability may also be achieved with a single vertical head having pairs of trackwise-aligned read and write elements that are constructed according to the well-known "piggyback" arrangement used in disk drives. Other conventional vertical head designs include heads in which all of the transducer elements "E," are either read elements or write elements. Read-after-write capability may then be achieved by bonding a read-only head to a write-only head to provide trackwise-aligned read and write element pairs.

A disadvantage of vertical head constructions as described above is that the transducer element gaps at the TBS must be sufficiently spaced from each other to provide room for the major portion of the transducer element structure that is recessed behind the TBS. For a write element, the recessed structure includes the pole pieces and the coil windings, which (as can be seen in FIG. 2) are quite bulky as compared to the write gap structure at the TBS. For a read element, the recessed structure includes the electrical leads and magnetic hard biasing elements (if present). These are also relatively bulky compared to the read gap structure at the TBS, although less so compared to write elements. The foregoing spacing requirements render the transducer array of a vertical head much wider than it needs to be for the number of tracks being read or written at any given moment. The problem is that the gap pitch within the transducer array is much larger than the gap width, such that for every track being read or written by the array, there will be space between the tracks where no transducing occurs. This "comb" effect can be seen in FIG. 2, which shows that for every pair of tracks "TR" aligned with adjacent read and write elements "R" and "W," there is inter-track white space on the tape "T" that is not transduced.

The comb effect can be solved by stepping the head in a cross-track direction during multiple transducing passes, such that the inter-track white space is ultimately recorded with data after some number of passes have been made. Tape tracks can also be written at less than the gap width of the write transducers using a process known as "shingling." According to this technique, the head is stepped by less than the write element gap width for each successive transducing pass, such that the edge of a previously written track is over-written during the next pass, much like shingles on a roof.

Although the foregoing track writing techniques allow data to be densely packed on a tape, a continuing unresolved problem is track misregistration caused by tape dimensional changes between writing and reading operations. For example, a tape may be written with data under one set of temperature and humidity conditions, and then later read following exposure to different environmental conditions. For conventional tape material, the dimensions can change by as much as 0.12%. These tape dimensional changes will widen or narrow the tape track spacing geometry, resulting in track misregistration with the tape head whose gap spacing geometry is substantially unchanged. Although rotation of the tape head can be used to address the misregistration problem by changing the effective track pitch of the transducer array, this solution requires sophisticated mechanics and skew compensation circuitry.

To illustrate the misregistration problem, assume the transducer array x μm between the outermost elements, and the percentage change in tape dimension is 0.12%. The resultant change in the spacing of the tape tracks under the outermost elements will be 0.0012x μm. On the other hand, if the transducer array spans 0.5x μm, then a 0.12% change in tape dimension will only change the tape track spacing under the outermost elements by 0.0006x μm. The 0.5x transducer array span will thus experience only half of the tape dimensional change that is experienced by the x transducer span, such that track misregistration is less likely.

Accordingly, it is desired to have an improved design for a thin film tape head for reading and writing data on magnetic recording tape. What is particularly needed is a head design that provides the ability to reduce the gap pitch of read and write elements.

SUMMARY OF THE INVENTION

The foregoing problems are solved and an advance in the art is obtained by a planar bidirectional tape head with planar read and write elements for reading and writing data on a magnetic recording tape. The tape head includes a substrate, a tape bearing surface for engaging the magnetic tape, one or more write element arrays formed on the substrate, and one or more read element arrays formed on the substrate. The one or more write element arrays and the one or more read element arrays comprise plural thin film layers oriented in generally parallel relationship with the tape bearing surface.

In one exemplary embodiment disclosed herein, the one or more write element arrays comprises write elements having a pancake coil construction. In another exemplary embodiment disclosed herein, the one or more write element arrays comprises write elements having a helical coil construction. In both embodiments, the transducing gaps of adjacent write elements may be generally aligned in a direction that is transverse to a streaming direction of the magnetic recording tape. The write elements may comprise a pair of pole tips providing a write gap at the tape bearing surface and a pair of pole pieces extending from the pole tips to a back gap region where the pole pieces are joined, with the back gap region being spaced in a trackwise direction from the write gap.

The one or more read element arrays may comprise read elements having thin film sensor layers spaced from the tape bearing surface, and a flux guide extending from the sensor layers to the tape bearing surface. The read elements may be arranged with spaced read gaps or with near contiguous read gaps in order to support bundle writing on adjacent tracks of the magnetic recording medium.

BRIEF DESCRIPTION OF THE DRAWINGS

The foregoing and other features and advantages of the invention will be apparent from the following more particular description of exemplary embodiments of the invention, as illustrated in the accompanying Drawings, in which:

FIG. 6 is write element cross-sectional view taken along line 6-6 in FIG. 5;

FIG. 7 is a head cross-sectional view taken along line 7-7 in FIG. 4;

FIG. 8 is a plan view showing an exemplary write module servo reader;

FIG. 9 is a cross-sectional view taken along line 9-9 in FIG. 8;

FIG. 10 is a side view taken in the direction of the arrows 10-10 in FIG. 9;

DETAILED DESCRIPTION OF THE EXEMPLARY EMBODIMENTS

Figure 1:
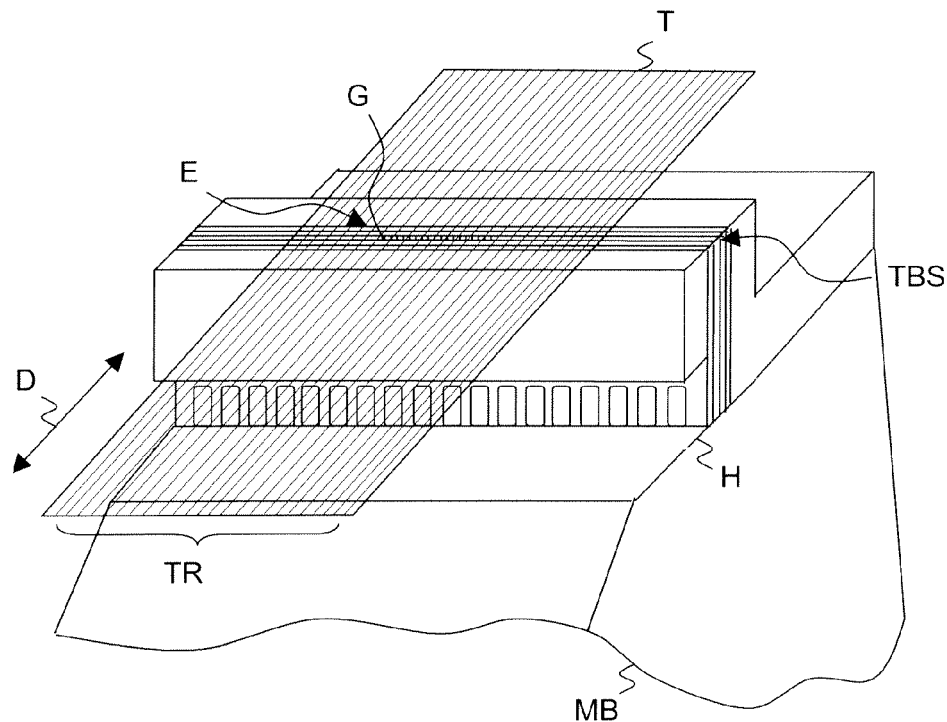
FIG. 1 is a perspective view showing a prior art thin film vertical tape head.
Figure 2:
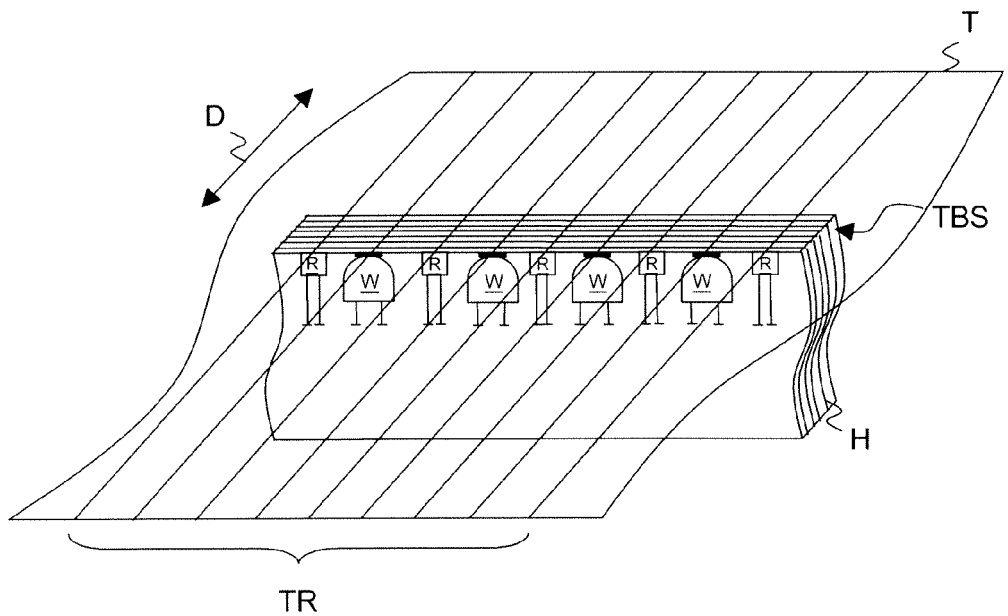
FIG. 2 is a perspective view showing an exemplary construction of the prior art tape head of FIG. 1.
Figure 3:
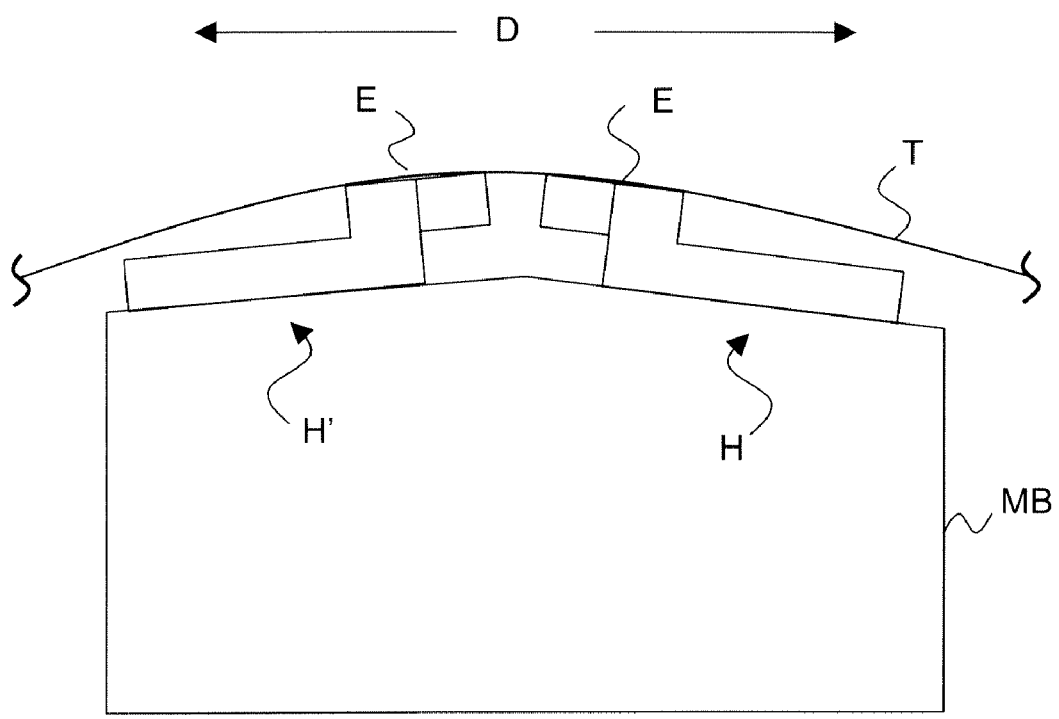
FIG. 3 is a side elevation view showing a pair of the vertical tape heads of FIG. 1 secured to a mounting block.

The invention will now be described by way of exemplary embodiments shown by the drawing figures (which are not necessarily to scale), in which like reference numerals indicate like elements in all of the several views.

Figure 4:
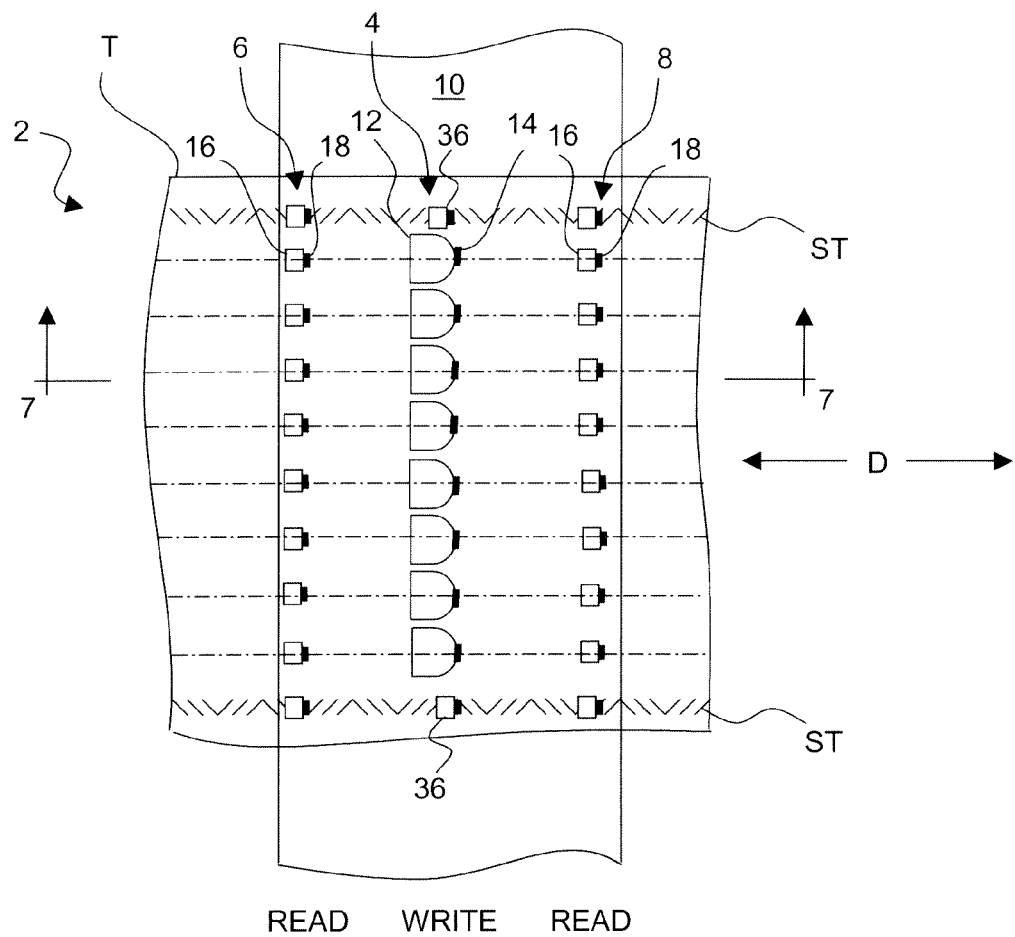
FIG. 4 is a partial plan view showing a tape bearing surface of an exemplary tape head, with a segment of magnetic recording tape superimposed over the tape head.

Turning now to FIG. 4, a tape head 2 is constructed according to an exemplary three-array configuration in which a write element array 4 is disposed between a pair of read element arrays 6 and 8. The tape head 2 has a tape bearing surface 10 for engaging a magnetic recording tape "T," one edge of which is shown in FIG. 4. As additionally shown in FIGS. 5-7, the write element array 4 has a planar head construction in which plural write elements 12 in the write element array each comprise plural thin film layers "L" oriented in generally parallel planar relationship with the tape bearing surface 10. It will be seen that the write elements 12 are arranged so that the transducing gaps 14 of adjacent write elements are generally aligned in a direction that is transverse to a streaming direction of the magnetic recording tape (shown by the arrow "D" in FIG. 4).

As can be seen in FIGS. 8-10, the read element arrays 6 and 8 also have a planar head construction in which plural read elements 16 in the write element array each comprise plural thin film layers "L" oriented in generally parallel planar relationship with the tape bearing surface 10. It will be seen that the read elements 16 are arranged so that the read gaps 18 of adjacent read elements are generally aligned in a direction that is transverse to a streaming direction of the magnetic recording tape.

In the exemplary embodiment represented by FIGS. 4-7, the write elements 12 comprise a pancake coil construction. According to this construction, the write coil 20 is constructed with plural coil windings in a single one of the thin film layers "L," as can be seen in FIG. 6. A pair of contact pads 22 and 24 are provided for connecting the write coil 20 to an information-modulated current source (not shown). The write elements 12 further comprise a pair of pole tips 26 and 28 that provide the write gap 14 at the tape bearing surface 10. A pair of pole pieces 30 and 32 respectively extend from the pole tips 26 and 28 to a back gap region 34 where the pole pieces are joined. The pole tips 26/28 and the pole pieces 30 and 32 can be formed from any suitable magnetically permeable material of the type conventionally used to fabricate inductive write heads for information storage. As can be seen in FIG. 6, the pole pieces 30 and 32 initially extend from the pole tips 26 and 28 in a direction that is generally perpendicular to the tape bearing surface 10. Each pole piece 30 and 32 then makes an approximate 90° bend at a separate one of the layers "L" of the write module 4, and thereafter extends generally parallel to the tape bearing surface 10 to the back gap region 34. The back gap region 34 is thereby spaced in a trackwise direction from the write gap 14.

Figure 5:
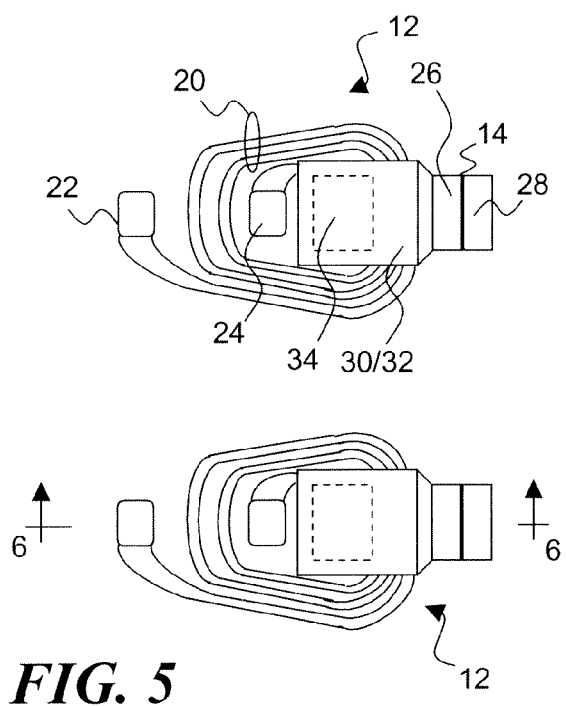
FIG. 5 is an enlarged plan view showing a portion of a write module of the tape head of FIG. 4.

It will be seen in FIGS. 5 and 6 that the write coil 20 wraps around the back gap region 34 with the coil windings on one side of the back gap region being disposed between the pole pieces 30 and 33. When the write coil 20 is energized, it will induce magnetic flux in the pole pieces 30 and 32 so as to produce a magnetic field at the pole tips 26 and 28 that propagates across the write gap 14. It will be appreciated that the strength of the magnetic field at the write gap 14 depends in part on the number of windings of the write coil 20. Although not shown, one way to increase the number of coil windings without increasing the overall size of the write elements (when viewed in the plan view orientation of FIG. 5) would be to form the additional windings on one or more separate layers "L" of the write module 4.

Figure 4A:
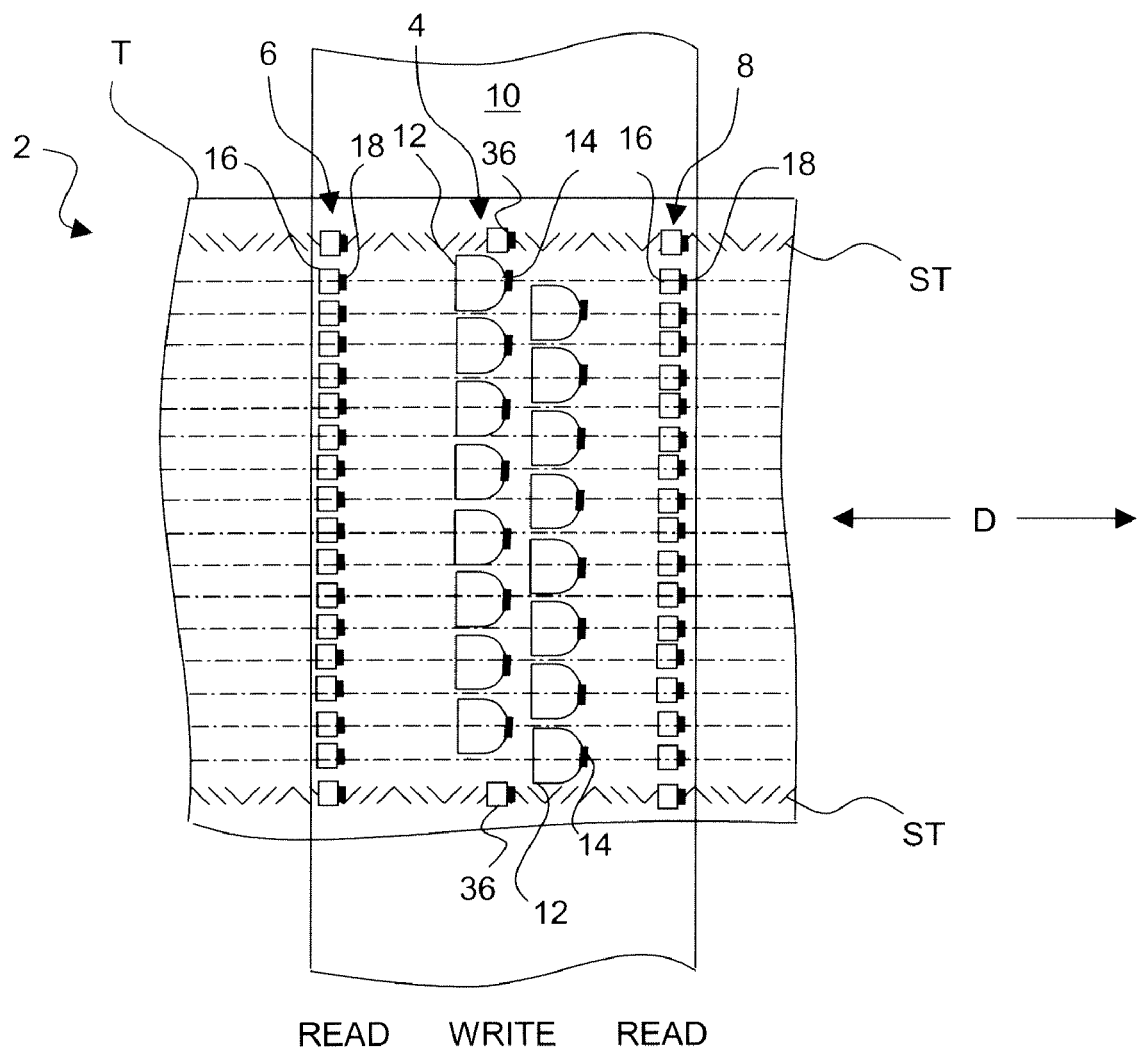
FIG. 4A is a partial plan view showing an alternative construction of the tape head of FIG. 4.

As shown in FIG. 4A, the write elements 12 may be arranged in one or more arrays. As further shown in FIG. 4B, the write elements 12 may be arranged in two arrays so that adjacent write elements have adjacent pole tips 26/28 but oppositely extending pole pieces 30/32 and back gaps 34. In both of FIGS. 4A and 4B, more tracks can be formed than with write module 4, with reduced track pitch. For example, depending on the size of the write coil 20, the write elements 12 may be arranged with spaced write gaps that are spaced by a desired separation distance (preferably not more than approximately one gap width), or with near contiguous write gaps having a nominal spacing that is substantially less than one gap width in order to bundle write on contiguous tracks of the magnetic recording medium. In the first instance, the gap pitch (i.e., the distance between the centerlines of adjacent write gaps) will be approximately 2 gap widths. In the second instance, the gap pitch will approximate the gap width. By way of example, a gap separation corresponding to the width of the write element erase band could be used. The gap pitch in that case will be the sum of the gap width and the erase band width. Typically, the erase band width is approximately 3-5 times the gap size (i.e., the separation between the pole pieces 30/32 in the direction of tape movement). Assuming a typical gap size of approximately 5 microns, the gap spacing (if equal to the erase band width), would be approximately 15-25 microns. Note that the size of the write coil 20 will depend in large part on the number of coil windings formed in any given layer "L," of the write module 4, which can be controlled by using plural layers as discussed above.

Figure 4B:
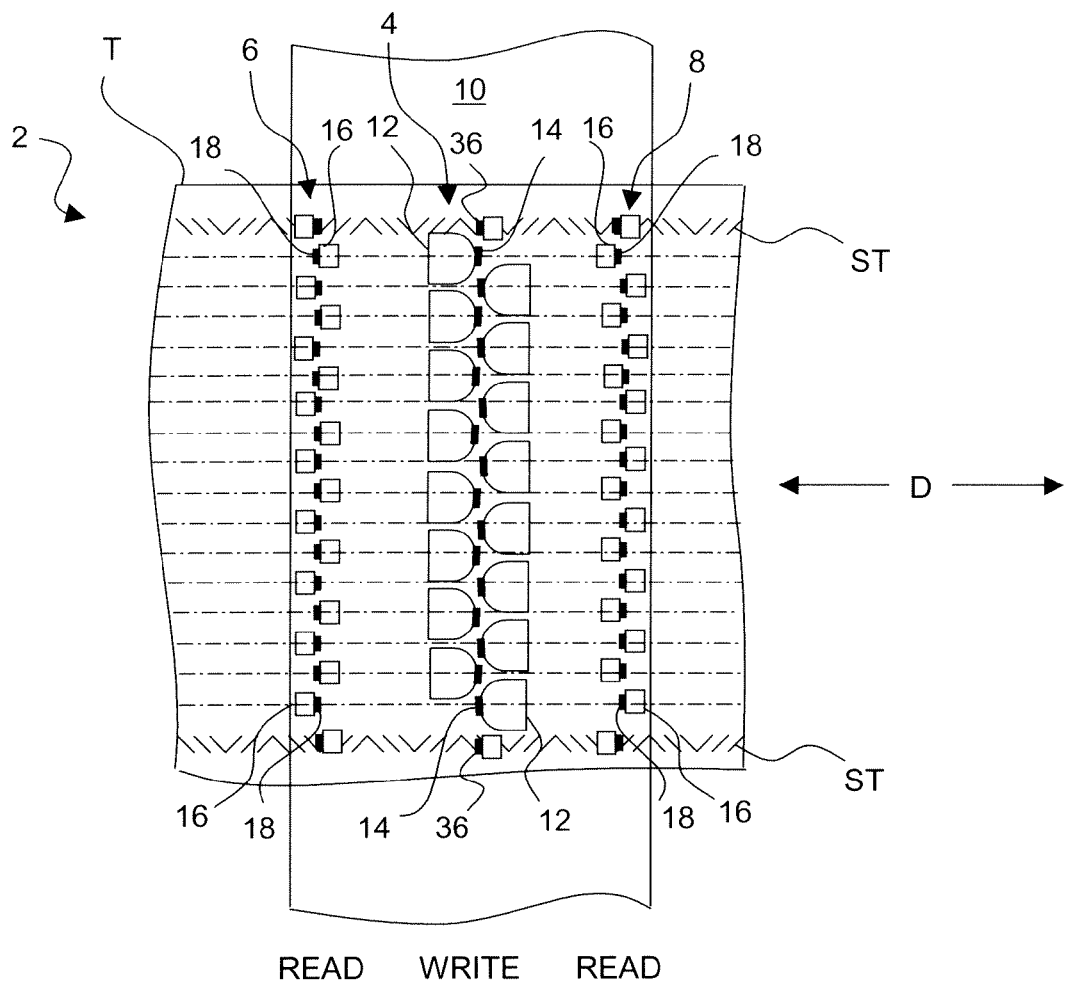
FIG. 4B is a partial plan view showing another alternative construction of the tape head of FIG. 4.
Figure 12:
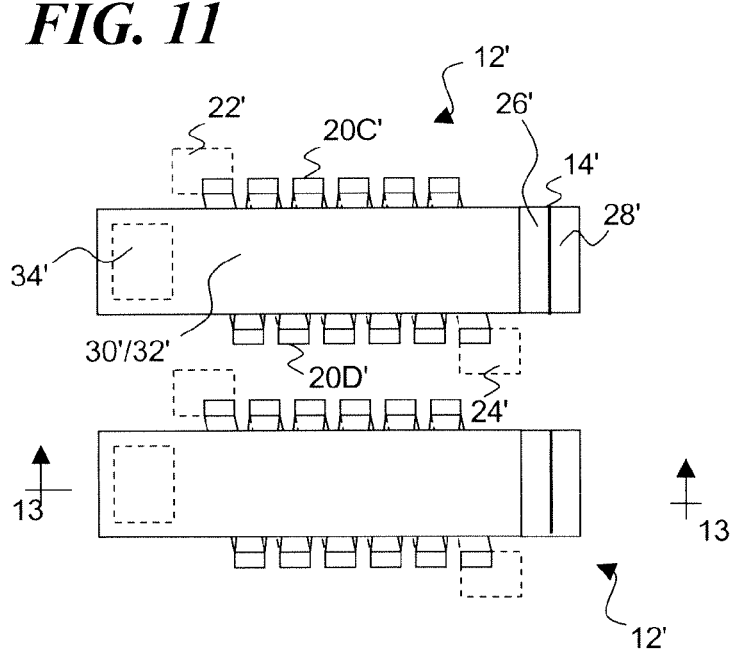
FIG. 12 is an enlarged plan view showing a portion of a write module of the tape head of FIG. 11.

As shown in FIG. 4, the tape head 2 includes servo read elements for reading conventional timing-based servo tracks "ST" on the tape "T." The servo read elements may be provided by additional read elements 16 in the read element arrays 6 and 8, or they may be provided by servo read elements 36 formed as part of the write element array 4. As shown in FIGS. 8-10, the various read elements 16 and 36 may each comprise a sensor structure 38 formed in plural thin film layers "L" of the write module 4 that are oriented in parallel planar relationship with the write module tape bearing surface 10. As persons skilled in the art will appreciate, the sensor structure layers may include a magnetic pinned layer 40, a spacer layer 42 and a magnetic free layer 44. A pair of electrode/hard biasing structures 46 may be provided on each side of the sensor structure to provide a CIP (Current-In-Plane) sensor. Although not shown, a CPP (Current-Perpendicular to-Plane) sensor could also be used. A conventional flux guide 47 is used to carry magnetic flux from the read gaps 18 at the tape bearing surface 10 to the free layer 44. In order to reduce read gap spacing in the read element arrays 6 and 8, the sensor structures 38 of adjacent read elements may be arranged to extend in opposite directions from the read gaps 18, as shown in FIG. 4B.

FIG. 7 shows the tape head 2 when viewed from the edge of the tape "T" of FIG. 4. As can be seen, electrical connections are respectively made to the write elements 14 and to the read elements 18 from electrical contact pads 48 formed on the surface of the tape head 2 which is opposite from the tape bearing surface 10. Electrical cables (not shown) may be attached to the contact pads 48 using conventional techniques. Although not shown, it would be possible to fabricate driver components, such as FETs (Field Effect Transistors), above the contact pads 48 of the write and read element arrays 4, 6 and 8. Alternatively, the drivers may be fabricated on separate chips, which are then mounted close to the tape head 2. As further shown in FIG. 7, the tape bearing surface 10 of the tape head 2 may be lapped to define a preferred tape wrap angle as the tape "T" streams over the head.

Figure 13:
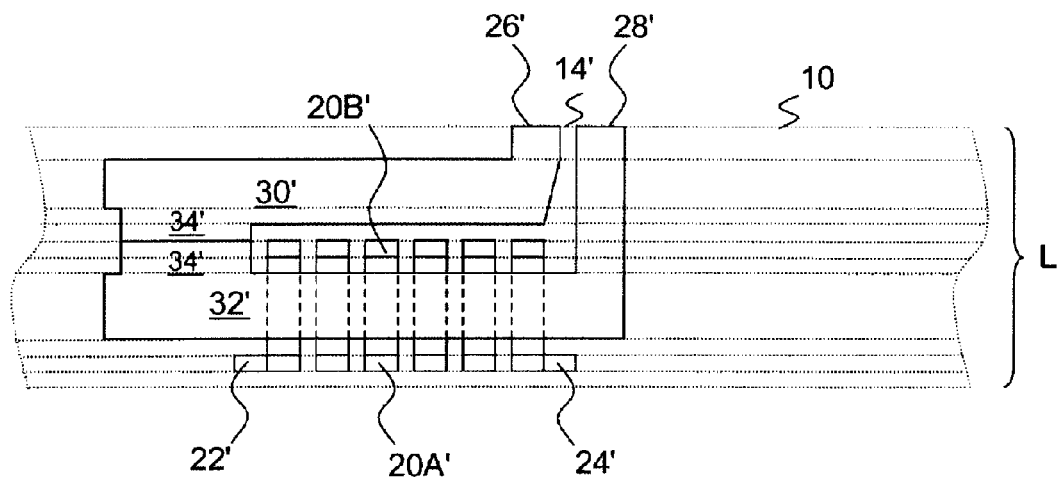
FIG. 13 is write element cross-sectional view taken along line 13-13 in FIG. 12.
Figure 14:
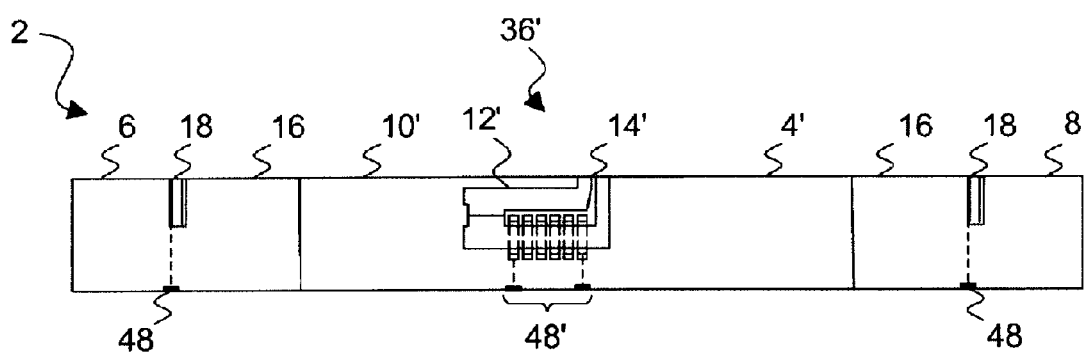
FIG. 14 is a head cross-sectional view taken along line 14-14 in FIG. 11.

Turning now to FIGS. 11-14, an alternative write element array 4' is shown for use in the tape head 2 in which the write elements 12' comprise a helical coil construction. According to this construction, the write coil 20' is constructed with plural coil windings in plural film layers "L," as can be seen in FIG. 13. In particular, a first set of coil winding elements 20A' is formed in a first one of the layers "L," a second set of coil winding elements 20B' is formed in a second one of the layers "L," and third and fourth sets of coil winding elements 20C' and 20D' (see FIG. 12) are formed in the intermediate layers that lie between the coil winding elements 20A' and 20B'. A pair of contact pads 22' and 24' are provided for connecting the write coil 20' to an information-modulated current source (not shown). The write elements 12' further comprise a pair of pole tips 26' and 28' that provide the write gap 14' at the tape bearing surface 10'. A pair of pole pieces 30' and 32' respectively extend from the pole tips 26' and 28' to a back gap region 34' where the pole pieces are joined. The pole tips 26'/28' and the pole pieces 30' and 32' can be formed from any suitable magnetically permeable material of the type conventionally used to fabricate inductive write heads for information storage. As can be seen in FIG. 13, the pole pieces 30' and 32' initially extend from the pole tips 26' and 28' in a direction that is generally perpendicular to the tape bearing surface 10'. Each pole piece 30' and 32' then makes an approximate 90° bend at a separate one of the layers "L" of the write module 4', and thereafter extends generally parallel to the tape bearing surface 10' to the back gap region 34'. The back gap region 34' is thereby spaced in a trackwise direction from the write gap 14'.

It will be seen in FIG. 13 that the write coil 20' wraps around the pole piece 32'. When the write coil 20' is energized, it will induce magnetic flux in the pole pieces 30' and 32' so as to produce a magnetic field at the pole tips 26' and 28' that propagates across the write gap 14'. It will be appreciated that the strength of the magnetic field at the write gap 14' depends in part on the number of windings of the write coil 20'. The number of winding of the write coil 20' can be increased by increasing the length of the pole pieces 30' and 32'.

Figure 11:
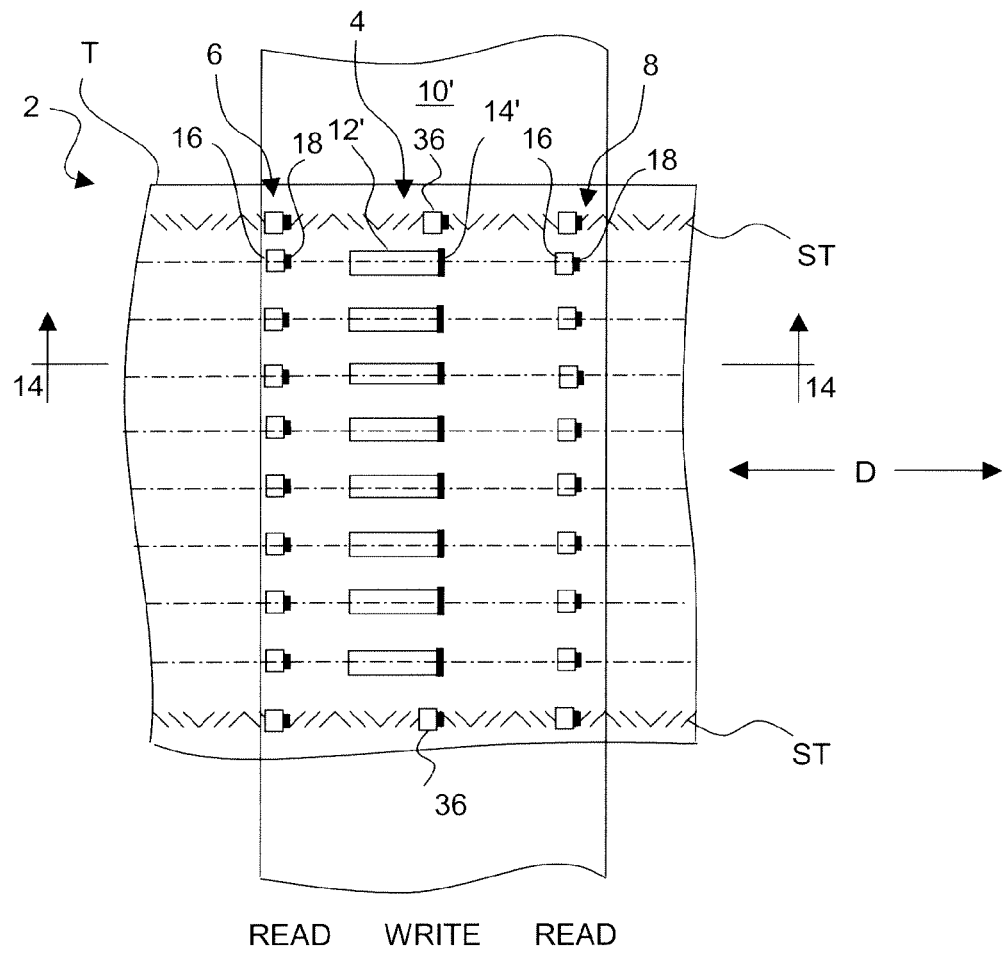
FIG. 11 is a partial plan view showing a tape bearing surface of another exemplary tape head, with a segment of magnetic recording tape superimposed over the tape head.
Figure 11A:
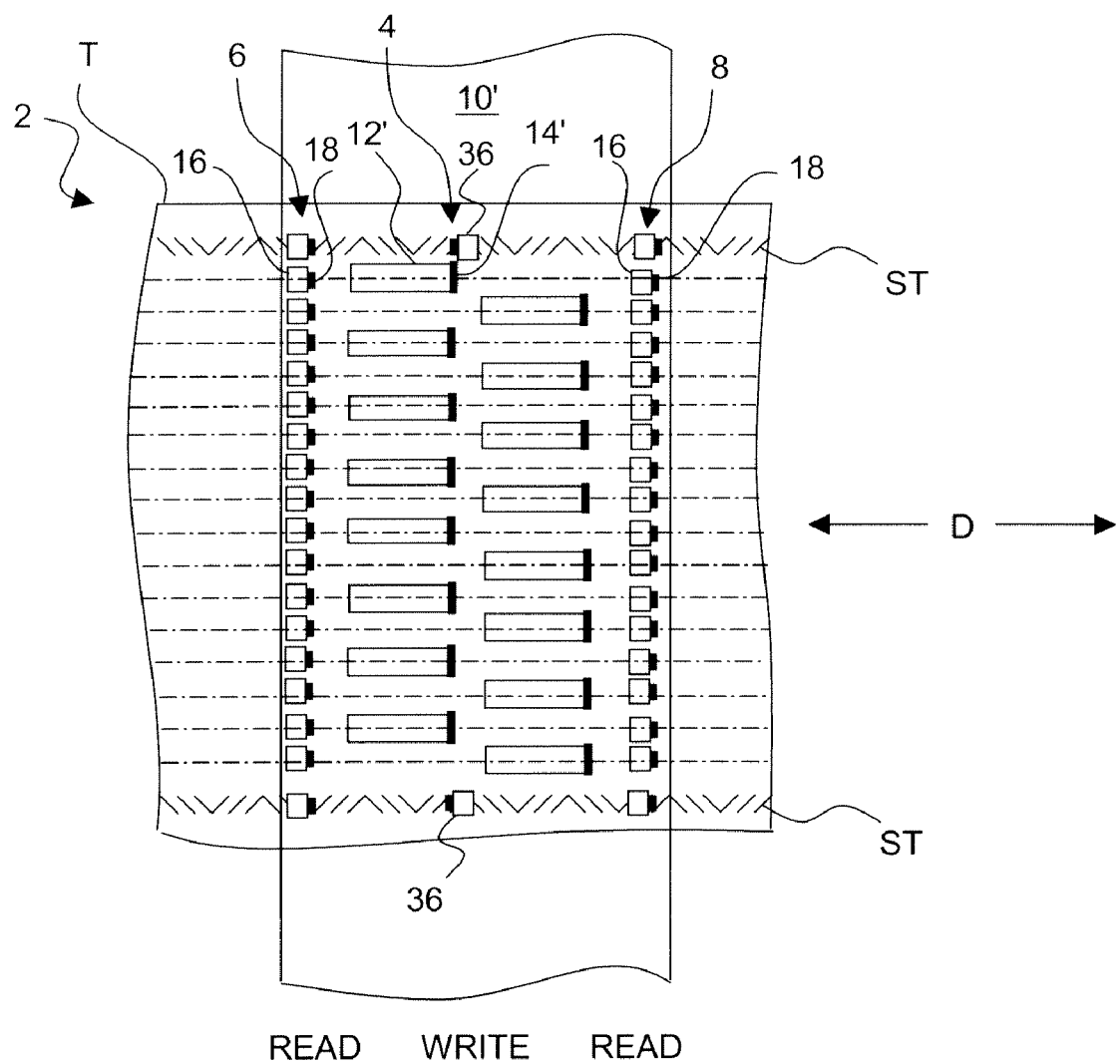
FIG. 11A is a partial plan view showing an alternative construction of the tape head of FIG. 11.
Figure 11B:
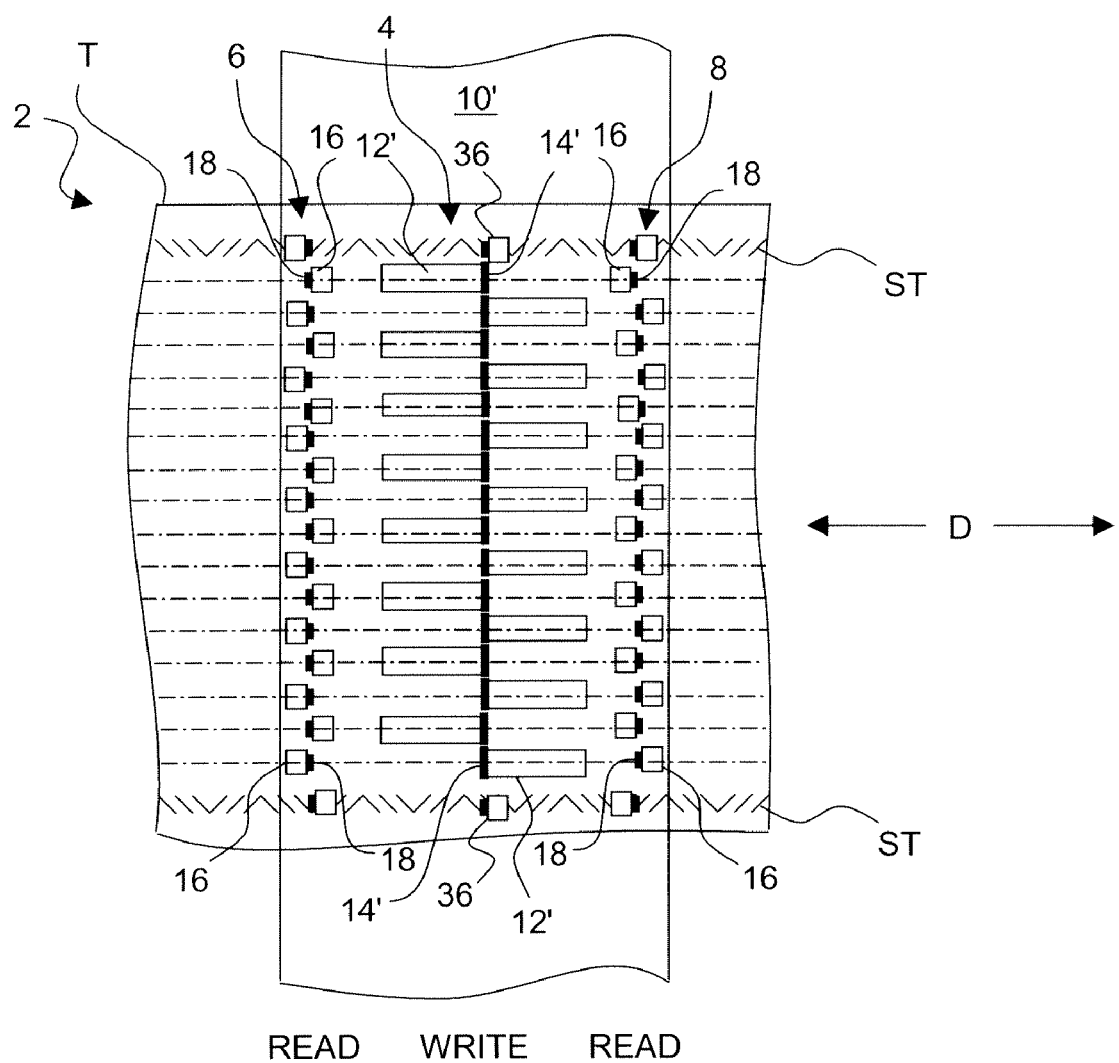
FIG. 11B is a partial plan view showing another alternative construction of the tape head of FIG. 11.
Figure 11C:
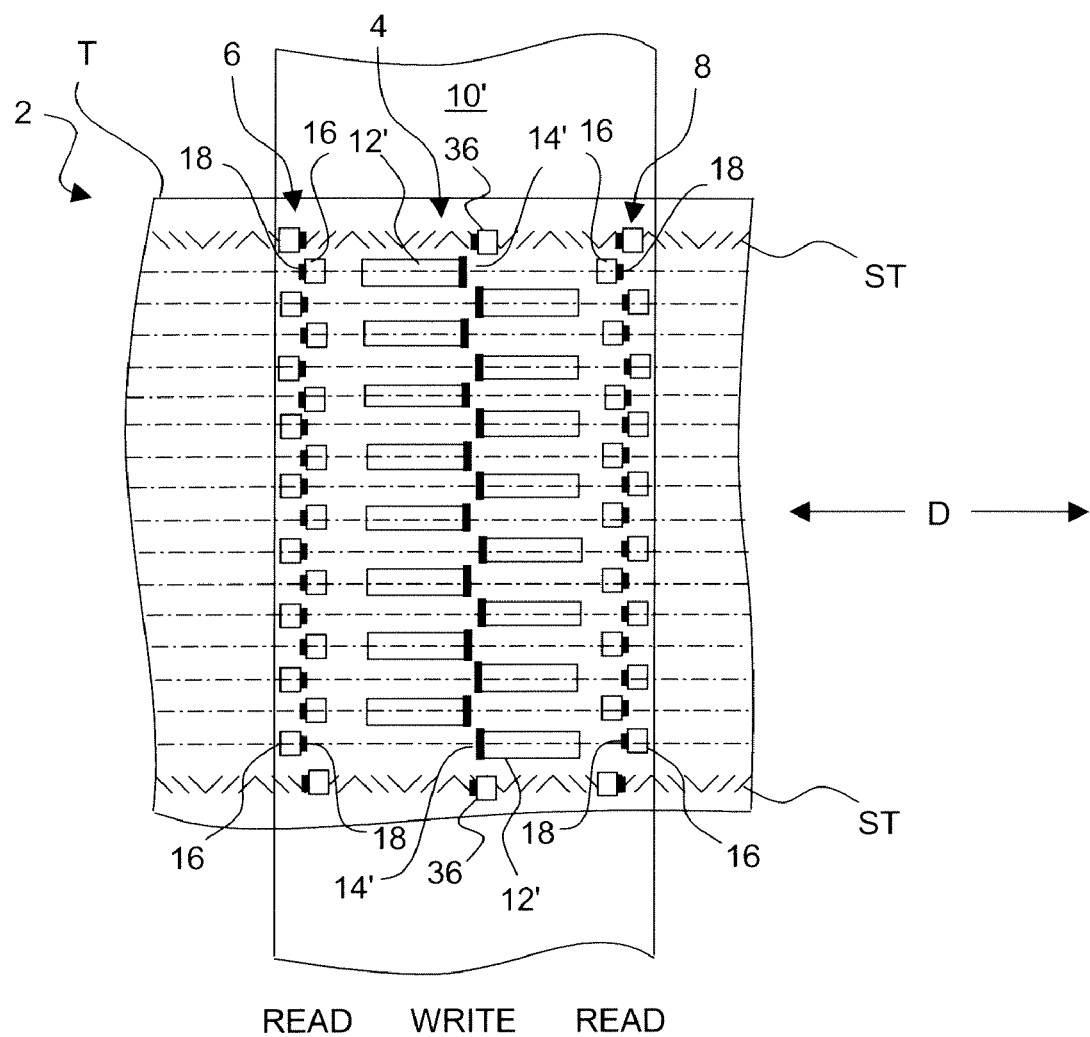
FIG. 11C is a partial plan view showing another alternative construction of the tape head of FIG. 11.

Note that the helical configuration of the write coil 20' allows the write elements 12' to have a relatively narrow profile (as compared to the pancake coil configuration described above) that facilitates reduced track pitch. As shown in FIG. 11A, the write elements 12' may be arranged in one or more arrays. As further shown in FIG. 11B, the write elements 12' may be arranged in two arrays so that adjacent write elements have adjacent pole tips 26'/28' but oppositely extending pole pieces 30'/32' and back gaps 34'. As additionally shown in FIG. 11C, processing expediency may dictate that the transducing gaps 14' of adjacent write elements 12' be slightly staggered. However, the write gaps 14' nonetheless remain symmetrically aligned about each side of a common axis that is transverse to the direction of tape movement. In each of FIGS. 11A, 11B and 11C, more tracks can be written in a single pass of the write module 4', with reduced track pitch. Depending on the size of the write coil 20', the write elements 12' may be arranged with spaced write gaps that are spaced by a desired separation distance (preferably not more than approximately one gap width), or with near contiguous write gaps having a nominal spacing that is substantially less than one gap width in order to bundle write on contiguous tracks of the magnetic recording medium. For example, as described above in connection with the write elements 12 of FIGS. 4A and 4B, a gap spacing corresponding to the erase band width of the write elements 12' may be used. The gap pitch will then be the sum of the gap width and the erase band width. Assuming a typical gap size of approximately 5 microns, the gap spacing (if equal to the erase band width), would be approximately 15-25 microns (assuming a typical erase band width of approximately 3-5 times the gap size).

Figure 15:
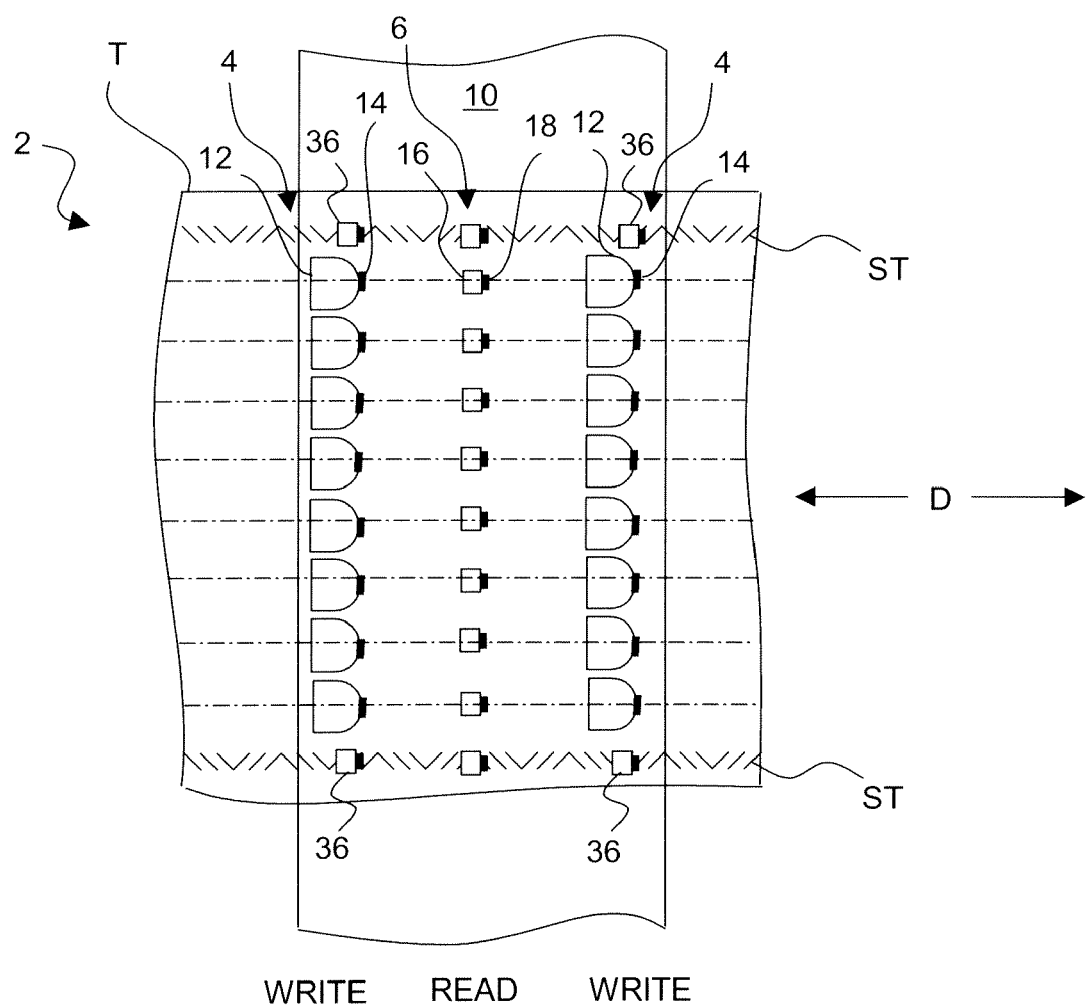
FIG. 15 is a partial plan view showing a tape bearing surface of another exemplary tape head, with a segment of magnetic recording tape superimposed over the tape head.

Turning now to FIG. 15, another three-array configuration of the tape head 2 is shown that is similar to the head configuration of FIG. 4, except that there are two of the write element arrays 4 disposed on either side of the read element array 6. The write element arrays 4 are formed using the write elements 12 of FIGS. 4-10, and the read element array 6 is formed using the read elements 16 of FIGS. 4-10. The remaining reference numerals of FIG. 15 correspond to the like-identified elements of FIGS. 4-10, and will not be re-described here. In an alternative construction (not shown), the write elements 12' of FIGS. 11-14 could be used to provide the write element arrays 4.

Figure 16:
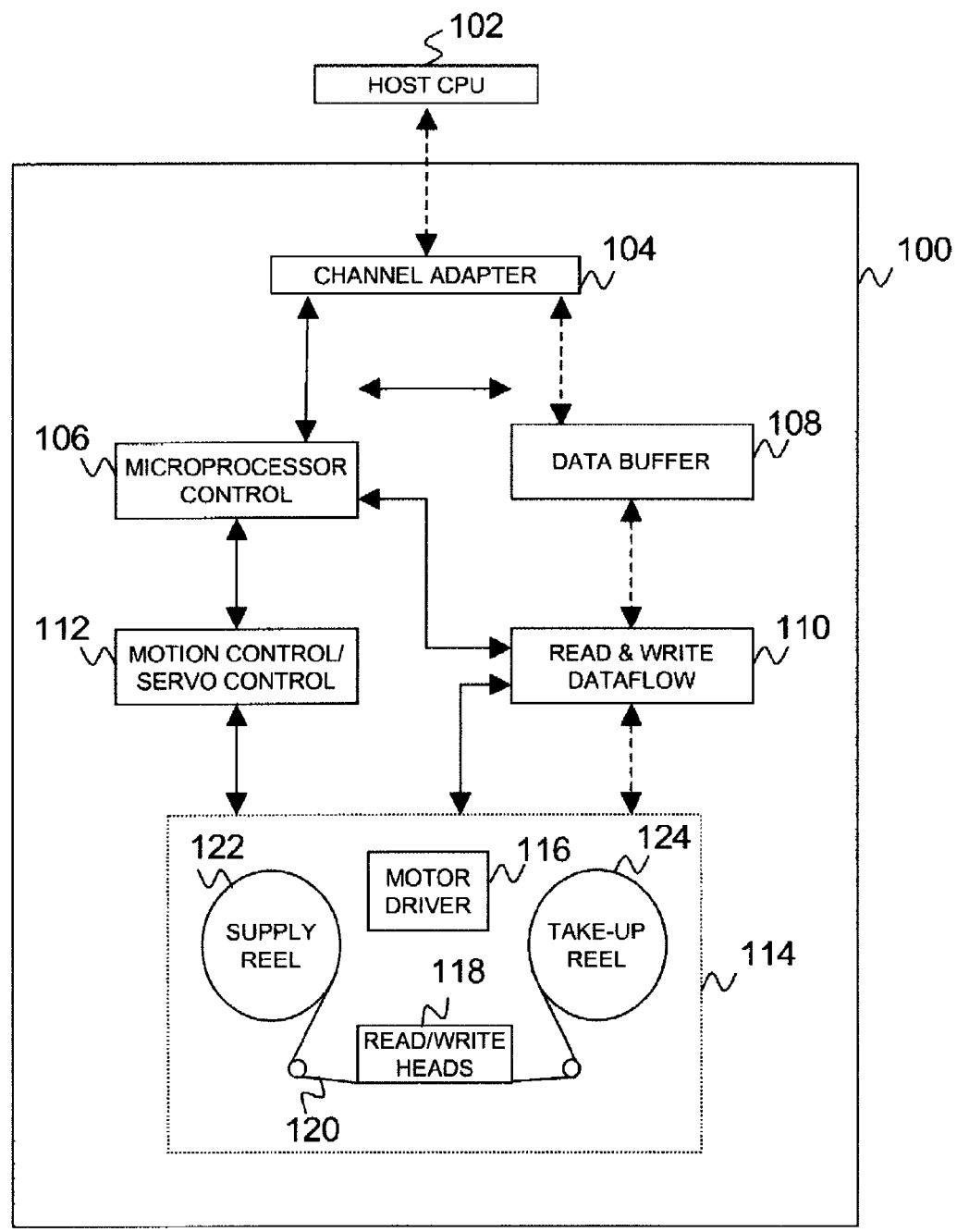
FIG. 16 is a functional block diagram showing a tape drive data storage device.

Turning to FIG. 16, the inventive concepts herein described may be embodied in a tape drive data storage device (tape drive) 100 for storing and retrieving data by a host data processing device 102, which could be a general purpose computer of other processing apparatus adapted for data exchange with the tape drive 100. The tape drive 100 includes plural components providing a control and data transfer system for reading and writing host data on a magnetic tape medium. By way of example only, those components may conventionally include a channel adapter 104, a microprocessor controller 106, a data buffer 108, a read/write data flow circuit 110, a motion control system 112, and a tape interface system 114 that includes a motor driver circuit 116 and a read/write head unit 118.

The microprocessor controller 106 provides overhead control functionality for the operations of the tape drive 100. As is conventional, the functions performed by the microprocessor controller 106 are programmable via microcode routines (not shown) according to desired tape drive operational characteristics. During data write operations (with all dataflow being reversed for data read operations), the microprocessor controller 106 activates the channel adapter 104 to perform the required host interface protocol for receiving an information data block. The channel adapter 104 communicates the data block to the data buffer 108 that stores the data for subsequent read/write processing. The data buffer 108 in turn communicates the data block received from the channel adapter 104 to the read/write dataflow circuitry 110, which formats the device data into physically formatted data that may be recorded on a magnetic tape medium. The read/write dataflow circuitry 110 is responsible for executing read/write data transfer operations under the control of the microprocessor controller 106. Formatted physical data from the read/write data flow circuitry 110 is communicated to the tape interface system 114. The latter includes one or more read/write heads in the read/write head unit 118, and drive motor components (not shown) for performing forward and reverse movement of a tape medium 120 mounted on a supply reel 122 and a take-up reel 124. The drive components of the tape interface system 114 are controlled by the motion control system 112 and the motor driver circuit 116 to execute such tape movements as forward and reverse recording and playback, rewind and other tape motion functions. In addition, in multi-track tape drive systems, the motion control system 112 transversely positions the read/write heads relative to the direction of longitudinal tape movement in order to record data in a plurality of tracks.

Figure 17:
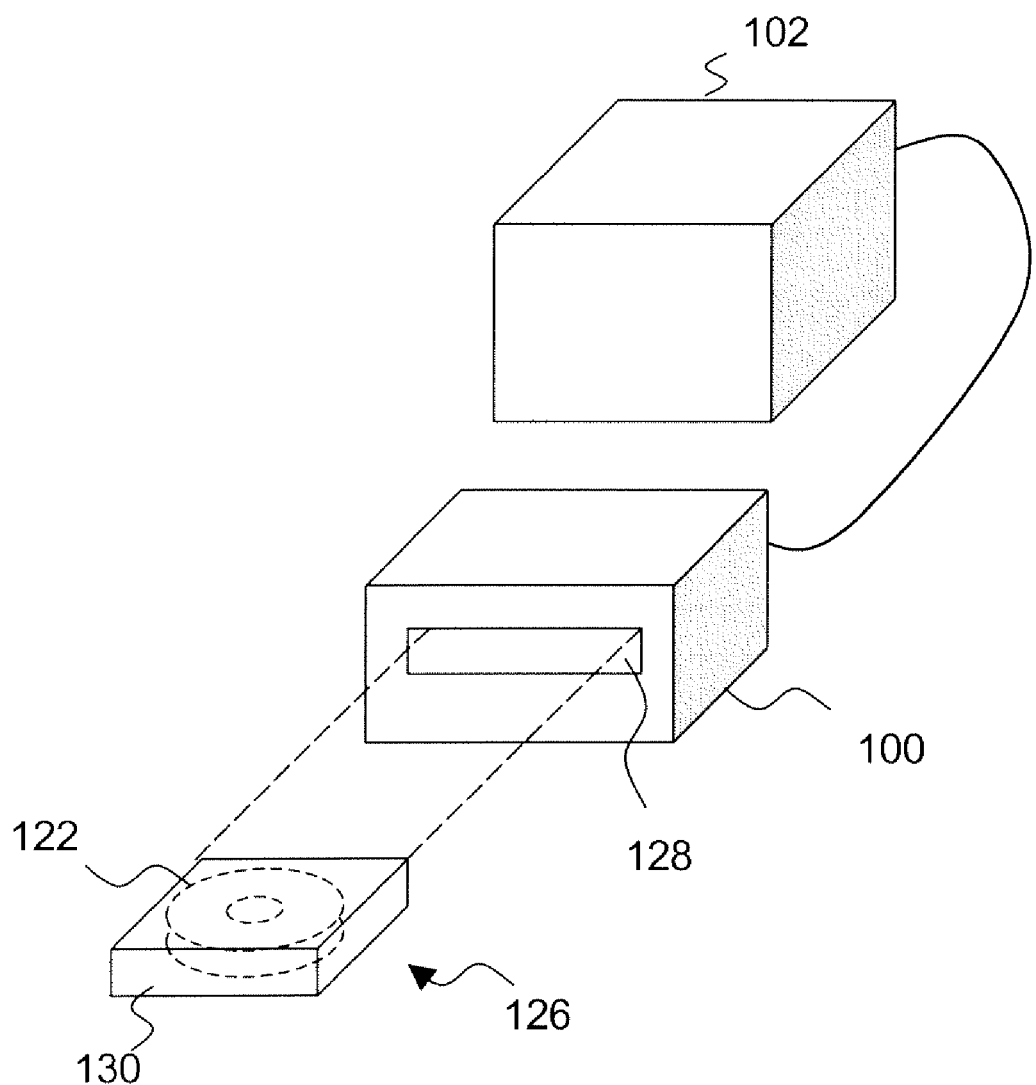
FIG. 17 is a perspective view showing an exemplary construction of the tape drive storage device of FIG. 16 for use with cartridge-based tape media.

In most cases, as shown in FIG. 17, the tape medium 120 will be mounted in a cartridge 126 that is inserted in the tape drive 100 via a slot 128. The tape cartridge 126 comprises a housing 130 containing the magnetic tape 120. The supply reel 122 is shown to be mounted in the housing 130.

Accordingly, a planar bidirectional tape head with planar read and write elements for use in a magnetic tape recording system has been disclosed. While various embodiments of the invention have been shown and described, it should be apparent that many variations and alternative embodiments could be implemented in accordance with the teachings herein. It is understood, therefore, that the invention is not to be in any way limited except in accordance with the spirit of the appended claims and their equivalents.

What is claimed is:

1. In a tape drive, a tape head for reading and writing data on a magnetic recording tape, comprising:
a substrate;
a tape bearing surface for engaging said magnetic tape;
two write element arrays formed on said substrate and arranged so that write gaps of every other write element are generally aligned in a direction that is transverse to a streaming direction of said magnetic recording tape;
said every other write element being determined by considering said write elements of said two write element arrays in sequential order based on their relative distance from an edge of said magnetic recording tape;
said two write element arrays being the only write element arrays on said substrate;
said two write element arrays comprise write elements having a pair of pole tips providing a write gap at said tape bearing surface and a pair of pole pieces extending from said pole tips to a back gap region where said pole pieces are joined, said back gap region being spaced in a trackwise direction from said write gap and wherein said write elements are arranged so that adjacent write elements have adjacent pole tips and adjacent pole pieces and back gap regions extending in the same direction;
said write elements being constructed and arranged so that the write gaps of sequentially adjacent write elements are spaced from each other by not more than approximately one write gap width;
one or more read element arrays formed on said substrate;
said two write element arrays and said one or more read element arrays comprising plural thin film layers oriented in a generally parallel planar relationship with said tape bearing surface; and
said tape head being operable to write data using all of said write elements simultaneously.

2. A tape in accordance with claim 1 wherein said two write element arrays are interposed between two read element arrays in a trackwise direction relative to said magnetic recording tape.

3. A tape drive in accordance with claim 1 wherein said two write element arrays comprise write elements having a pancake coil construction.

4. A tape drive in accordance with claim 1 wherein said two write element arrays comprise write elements having a helical construction.

5. A tape drive in accordance with claim 1 wherein said two write element arrays comprise adjacent write elements arranged for contiguous track bundle writing.

6. A tape drive in accordance with claim 1 wherein said two write element arrays comprise adjacent write elements arranged with near contiguous write gaps in order to bundle write on contiguous tracks of said magnetic recording medium.

7. A tape drive in accordance with claim 1 wherein said one or more read element arrays comprise read elements having a thin film sensor structure spaced from said tape bearing surface and a flux guide extending from said sensor structure to a read gap at said tape bearing surface.

8. A tape drive in accordance with claim 1 wherein said one or more read element arrays are arranged so that the transducing gaps of adjacent read elements are aligned in a direction that is generally transverse to a streaming direction of said magnetic recording tape.

9. A tape head for reading and writing data on a magnetic recording tape, comprising:
   a substrate;
   a tape bearing surface for engaging said magnetic tape;
   two write element arrays formed on said substrate and arranged so that write gaps of every other write element are generally aligned in a direction that is transverse to a streaming direction of said magnetic recording tape;
   said every other write element being determined by considering said write elements in sequential order based on their relative distance from an edge of said magnetic recording tape;
   said two write element arrays being the only write element arrays on said substrate;
   said write elements being constructed and arranged so that the write gaps of sequentially adjacent write elements are spaced from each other by not more than approximately one write gap width;
   one or more read element arrays formed on said substrate;
   said one or two write element arrays and said one or more read element arrays comprising plural thin film layers oriented in a parallel planar relationship with said tape bearing surface;
   said two write element arrays comprising write elements having a pancake coil construction with a pair of pole tips providing a write gap at said tape bearing surface and a pair of pole pieces extending from said pole tips to a back gap region where said pole pieces are joined, said back gap region being spaced in a trackwise direction from said write gap, and said write elements are arranged so that adjacent write elements have adjacent pole tips and adjacent pole pieces and back gap regions extending in the same direction; and
   said tape head being operable to write data using all of said write elements simultaneously.

10. A tape head in accordance with claim 9 wherein said sequentially adjacent write elements are arranged with near contiguous write gaps.

11. A tape head in accordance with claim 9 wherein said two write element arrays are interposed between two of said read element arrays in a trackwise direction relative to said magnetic recording tape.

12. A tape head in accordance with claim 9 wherein said one or more read element arrays comprise read elements having a thin film sensor structure spaced from said tape bearing surface and a flux guide extending from said sensor structure to a read gap at said tape bearing surface.

13. A tape head in accordance with claim 9 wherein said one or more read element arrays are arranged so that the transducing gaps of adjacent read elements are aligned in a direction that is generally transverse to a streaming direction of said magnetic recording tape.

14. A tape head for reading and writing data on a magnetic recording tape, comprising:
   a substrate;
   a tape bearing surface for engaging said magnetic tape;
   two write element arrays formed on said substrate and arranged so that write gaps of every other write element are generally aligned in a direction that is transverse to a streaming direction of said magnetic recording tape;
   said every other write element being determined by considering said write elements of said two write element arrays in sequential order based on their relative distance from an edge of said magnet recording tape;
   said two write element arrays being the only write element arrays on said substrate;
   said write elements being constructed and arranged so that the write gaps of sequentially adjacent write elements are spaced from each other by not more than approximately one write gap width;
   one or more read element arrays formed on said substrate;
   said two write element arrays and said one or more read element arrays comprising plural thin film layers oriented in a parallel planar relationship with said tape bearing surface;
   said two write element arrays comprising write elements having a helical coil construction with a pair of pole tips providing a write gap at said tape bearing surface and a pair of pole pieces extending from said pole tips to a back gap region where said pole pieces are joined, said back gap region being spaced in a trackwise direction from said write gap, and said write elements are arranged so that adjacent write elements have adjacent pole tips and adjacent pole pieces and back gap regions extending in the same direction; and
   said tape head being operable to write data using all of said write elements simultaneously.

15. A tape head in accordance with claim 14 wherein said sequentially adjacent write elements are arranged with near contiguous write gaps.

16. A tape head in accordance with claim 14 wherein said two write element arrays are interposed between two of said read element arrays in a trackwise direction relative to said magnetic recording tape.

17. A tape head in accordance with claim 14 wherein said one or more read element arrays comprise read elements having a thin film sensor structure spaced from said tape bearing surface and a flux guide extending from said sensor structure to a read gap at said tape bearing surface.

18. A tape head in accordance with claim 17 wherein said one or more read element arrays are arranged so that the transducing gaps of adjacent read elements are aligned in a direction that is generally transverse to a streaming direction of said magnetic recording tape.

* * * * *